(12) United States Patent
Turner et al.

(10) Patent No.: US 12,552,131 B2
(45) Date of Patent: Feb. 17, 2026

(54) COMPOSITE BOARD WITH EDGE REINFORCEMENT FOR IMPROVED MECHANICAL PERFORMANCE

(71) Applicant: OWENS CORNING INTELLECTUAL CAPITAL, LLC, Toledo, OH (US)

(72) Inventors: Darrell James Turner, Anderson, SC (US); Dinh Chi Pham, Granville, OH (US); Daryl Paul Wernette, Alexandria, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 19/080,138

(22) Filed: Mar. 14, 2025

(65) Prior Publication Data

US 2025/0205993 A1 Jun. 26, 2025

Related U.S. Application Data

(63) Continuation of application No. PCT/US2024/019368, filed on Mar. 11, 2024.

(60) Provisional application No. 63/489,596, filed on Mar. 10, 2023.

(51) Int. Cl.
*B32B 5/18* (2006.01)

(52) U.S. Cl.
CPC ............ *B32B 5/18* (2013.01); *B32B 2250/04* (2013.01); *B32B 2250/05* (2013.01); *B32B 2266/0214* (2013.01)

(58) Field of Classification Search
CPC .... B32B 5/18; B32B 5/04; B32B 5/08; B32B 2250/04; B32B 2250/05; B32B 2266/0214; B32B 2266/08; B32B 17/06; B32B 25/04; B32B 2307/206; B32B 2266/0228; B32B 2266/0235; B32B 2266/02; B32B 2266/0264; B32B 2266/025; B32B 3/04; B32B 3/08; B32B 15/04
USPC .......................................................... 428/221
See application file for complete search history.

(56) References Cited

U.S. PATENT DOCUMENTS

| | | |
|---|---|---|
| 3,189,514 A | 6/1965 | Shriver et al. |
| 5,747,151 A | 5/1998 | Tingley |
| 5,928,735 A | 7/1999 | Padmanabhan et al. |
| 5,928,772 A | 7/1999 | Shiraishi et al. |
| 6,105,321 A | 8/2000 | Karisallen et al. |
| 6,427,403 B1 | 8/2002 | Tambakis |

(Continued)

FOREIGN PATENT DOCUMENTS

| | | |
|---|---|---|
| CN | 201255289 | 6/2009 |
| CN | 101871558 | 10/2010 |

(Continued)

OTHER PUBLICATIONS

International Search Report for International Application PCT/US2024/019368, mailed Jun. 26, 2024.

(Continued)

*Primary Examiner* — Camie S Thompson
(74) *Attorney, Agent, or Firm* — IceMiller LLP (57) ABSTRACT

A composite board includes an inner core defining a top side, a bottom side, a first lateral side, and a second lateral side, the inner core including a polymeric composition. At least one reinforcing tape layer extends at least partially along the first lateral side and the second lateral side of the inner core, and an outer skin layer surrounds the inner core and the at least one reinforcing tape layer.

16 Claims, 7 Drawing Sheets

(56) References Cited

U.S. PATENT DOCUMENTS

| | | |
|---|---|---|
| 6,579,605 B2 | 6/2003 | Zehner |
| 6,591,567 B2 | 7/2003 | Hota et al. |
| 6,592,962 B2 | 7/2003 | Edwards et al. |
| 6,767,623 B1 | 7/2004 | Möck et al. |
| 6,811,877 B2 | 11/2004 | Haislet et al. |
| 7,241,484 B2 | 7/2007 | Van Dijk et al. |
| 7,735,279 B2 | 6/2010 | Paradis et al. |
| 7,765,761 B2 | 8/2010 | Paradis |
| 7,862,675 B1 | 1/2011 | Gray et al. |
| 8,021,595 B2 | 9/2011 | Birrell |
| 8,123,887 B2 | 2/2012 | Green |
| 8,163,810 B2 | 4/2012 | Howie, Jr. et al. |
| 8,273,450 B2 | 9/2012 | Green |
| 8,357,457 B2 | 1/2013 | Green et al. |
| 8,607,531 B2 | 12/2013 | Schiffmann et al. |
| 9,139,937 B2 | 9/2015 | Blaszak et al. |
| 9,284,736 B1 | 3/2016 | Preuss |
| 9,821,533 B2 | 11/2017 | Baldwin et al. |
| 9,896,850 B2 | 2/2018 | Guhde et al. |
| 9,951,191 B2 | 4/2018 | Stanhope et al. |
| 10,428,204 B2 | 10/2019 | Andrews et al. |
| 10,556,388 B2 | 2/2020 | Treece et al. |
| 10,603,869 B2 | 3/2020 | Morihashi et al. |
| 10,753,102 B2 | 8/2020 | Van Giel et al. |
| 10,801,205 B2 | 10/2020 | Leatherman et al. |
| 10,850,440 B2 | 12/2020 | Buckingham et al. |
| 2002/0020033 A1 | 2/2002 | Lang |
| 2003/0148085 A1 | 8/2003 | Edwards |
| 2005/0191479 A1 | 9/2005 | Harder |
| 2006/0097469 A1 | 5/2006 | Nosworthy et al. |
| 2009/0062413 A1 | 3/2009 | Adur et al. |
| 2011/0244213 A1 | 10/2011 | Jones |
| 2012/0324815 A1 | 12/2012 | Schiffmann et al. |
| 2014/0144102 A1 | 5/2014 | Chen |
| 2015/0315779 A1 | 11/2015 | Baily et al. |
| 2017/0145692 A1 | 5/2017 | Zheng et al. |
| 2017/0153089 A1 | 6/2017 | Bahu et al. |
| 2018/0036993 A1 | 2/2018 | Savonuzzi |
| 2018/0148141 A1 | 5/2018 | Cheung et al. |
| 2020/0011060 A1 | 1/2020 | Haynes et al. |
| 2022/0203631 A1 | 6/2022 | Lu et al. |
| 2023/0024168 A1 | 1/2023 | Polen et al. |
| 2023/0065390 A1 | 3/2023 | Jones et al. |

FOREIGN PATENT DOCUMENTS

| | | |
|---|---|---|
| CN | 101871560 | 10/2010 |
| CN | 201779435 | 3/2011 |
| CN | 103009736 | 4/2013 |
| CN | 203063190 | 7/2013 |
| CN | 204869907 | 12/2015 |
| CN | 105625680 | 6/2016 |
| CN | 109719964 | 5/2019 |
| CN | 209114639 | 7/2019 |
| CN | 209813317 | 12/2019 |
| CN | 111070809 | 4/2020 |
| CN | 112727319 | 4/2021 |
| CN | 112874089 | 6/2021 |
| CN | 113561577 | 10/2021 |
| CN | 218906501 | 4/2023 |
| DE | 102020205887 | 11/2021 |
| EP | 0768949 | 4/1997 |
| WO | 1996013378 | 5/1996 |
| WO | 2000010804 | 3/2000 |
| WO | 2013150166 | 10/2013 |
| WO | 2021258422 | 12/2021 |
| WO | 2022169826 | 8/2022 |

OTHER PUBLICATIONS

Wickramaarachchi, et al., Effect of particulate fillers on natural rubber/high-density polyethylene blends for roofing application, Polymers and Polymer Composites, 2021, pp. 763-769, vol. 29(6), Sage, 2020.

COMPOSITE BOARD WITH EDGE REINFORCEMENT FOR IMPROVED MECHANICAL PERFORMANCE

CROSS-REFERENCE TO RELATED APPLICATIONS

This application is a continuation of International Application No. PCT/US2024/019368, filed on Mar. 11, 2024, which claims priority to and the benefit of U.S. Provisional Application No. 63/489,596, filed on Mar. 10, 2023. The disclosures of the above applications are incorporated herein by reference in their entireties.

FIELD

This present disclosure relates to boards for use in construction and features to improve mechanical performance in various types of structural configurations.

BACKGROUND

The statements in this section merely provide background information related to the present disclosure and may not constitute prior art.

Natural hardwood has long been used to construct homes, ceilings, flooring, decks, marinas, various construction projects. Although natural hardwood is attractive and possesses good anti-slip properties, wood surfaces are susceptible to rotting and mold growth upon excessive exposure to water and/or certain insects. Hardwood also easily scratches, fades, and produces splinters.

Moreover, certain trees have increasingly been seen as a valuable natural resource as forests become depleted due to human encroachment and development. Due to the concern over our natural resources, it is thus not surprising that engineered wood, often referred to as composite wood, has gained popularity over the years. Engineered wood consists of real wood generally in the form of leftover wood scraps, including particles and fibers, resulting from the manufacture of lumber from hardwoods or softwoods. The engineered wood is manufactured to pre-established design specifications by fixing the wood scraps together with adhesives or resins.

One of the disadvantages of engineered wood is that it is not appropriate for outdoor use because it readily soaks up water and therefore is susceptible to warping, rotting and mold growth. Others have attempted to solve these issues by developing wood-plastic composites that contain wood fibers in combination with commodity plastics such as polyethylene and polyvinylchloride.

SUMMARY

This section provides a general summary of the disclosure and is not a comprehensive disclosure of its full scope or all of its features.

Various aspects of the technology described herein are generally directed to, among other things, composite board having edge reinforcements to improve mechanical performance in various types of construction. In one example, a "composite board" refers to a building material that is manufactured from any suitable polymer including any number of layers, in addition to reinforcements as described herein. Example polymeric compositions include high density polyethylene (HDPE), polyvinyl chloride (PVC), polymethyl methacrylate (PMMA), polyester resin (PR), polystyrene (PS), polypropylene (PP), phenolic resin (PF), and organic silicon resin (OSR), to name a few. It should be understood that both thermoplastic and thermoset polymers are within the scope of the present disclosure. In one form, the composite board includes (1) an inner core comprising a polymeric composition, (2) a reinforcing tape layer (for example, reinforced with HDPE or other polymer) positioned around an exterior surface of the inner core, and (3) an outer skin layer comprising a polymer and that is applied over and surrounds the inner core and the reinforcing tape layer.

In one form of the present disclosure, a composite board includes: an inner core defining a top side, a bottom side, a first lateral side, and a second lateral side, the inner core includes a polymeric composition; at least one reinforcing tape layer extending at least partially along the first lateral side and the second lateral side of the inner core; and an outer skin layer encapsulating the inner core and the at least one reinforcing tape layer.

In variation of this composite board, which may be implemented individually or in combination: the at least one reinforcing tape layer includes: an upper layer extending along the top side, around opposed upper corners, and extending along a portion of the first lateral side and the second lateral side of the inner core; and a lower layer extending along the bottom side, around opposed lower corners, and extending along a portion of the first lateral side and the second lateral side of the inner core; at least 33% of a length of each of the first lateral side and the second lateral side of the inner core is not reinforced by the upper layer or the lower layer; the upper layer and the lower layer cover less than 50% of a length of each of the first lateral side and the second lateral side of the inner core; the at least one reinforcing tape layer includes: an upper layer extending along a portion of the top side of the inner core; a lower layer extending along a portion of the bottom side of the inner core; a first lateral layer extending along a portion of the first lateral side of the inner core; and a second lateral layer extending along a portion of the second lateral side of the inner core; at least 33% of a length of each of the first lateral side and the second lateral side of the inner core is not reinforced by the first lateral layer or the second lateral layer; the first lateral layer and the second lateral layer cover less than 50% of a length of each of the first lateral side and the second lateral side of the inner core; further include at least one reinforcement rod extending longitudinally through the inner core; further include two reinforcement rods, each reinforcement rod being located proximate the first lateral side and the second lateral side, respectively, of the inner core; the at least one reinforcing tape layer includes an upper layer extending along a portion of the top side of the inner core and a lower layer extending along a portion of the bottom side of the inner core; the at least one reinforcement rod is a polymer material; the at least one reinforcement rod is round; the inner core includes a foam material; the foam material includes reinforcements; the reinforcements are selected from the group consisting of calcium carbonate (CaCO3), talc, discontinuous glass fibers, glass nanotubes, wood, hemp, straw, flax, jute, sisal, bamboo, and cotton; and the polymeric composition of the inner core includes a polymer selected from the group consisting of high density polyethylene (HDPE), polyvinyl chloride (PVC), polymethyl methacrylate (PMMA), polyester resin (PR), polystyrene (PS), polypropylene (PP), phenolic resin (PF), and organic silicon resin (OSR); and the inner core includes wood reinforcements.

In one form, the inner core includes a polymeric composition, such as HDPE, and the inner core layer is sized with a width that extends between a first lateral side and a second lateral side of the inner core. In one form, the reinforcing tape layer has a width that is larger than the width of the inner core layer. When the reinforcing tape layer is applied over the surface of the inner core, the reinforcing tape extends along the surface of the inner core, around respective corners of the inner core, and past the first lateral side and the second lateral side of the inner core. To provide additional edge reinforcements, pressure is applied to the portion of the reinforcing tape extending past the first lateral side and the second lateral side to apply the tape to corresponding surface of the first lateral side and the second lateral side of the inner core. When applied to the first lateral side and the second lateral side of the inner core, the reinforcing tape layer is arranged in a U-configuration so as to adhesively couple to the surface (for example, a top surface or a bottom surface) of the inner core and corresponding surfaces of the first lateral side and the second lateral side of the inner core. In one example, the reinforcing tape layer arranged in the U-configuration couples to less than 50% the total distance along the first lateral side or the second lateral side of the inner core layer. In one form, an outer skin layer is applied over the inner core and the reinforcing tape layer, thereby enclosing/encapsulating the inner core and the reinforcing tape layer and defining a final shape profile of the composite board.

According to the teachings herein, edge reinforcement may be achieved using additional or alternative structural configurations. In one form, the inner core includes a reinforcement rod extending from a front of the composite board to a back of the composite board along a longitudinal direction (for example, substantially perpendicular to the lateral direction). In one example, the reinforcement rod is a polymeric material, such as a thermoset. In one example, the reinforcement rod is located distally from a centerline of the composite board, such that the centerline extends along the longitudinal direction and is the midpoint between the first lateral side and the second lateral side. In this manner, the reinforcement rod is positioned within the inner core between the centerline and the first lateral side and/or the second lateral side. In one example, the reinforcement rod is made of any polymeric (e.g., thermoplastic) that is positioned within the inner core to increase bending stiffness.

Furthermore, in another form, reinforcement of the composite board is achieved using a plurality of layers of tape on each side of the inner core of composite board, rather than wrapping around the corners. For example, the plurality of layers of tape include a first reinforcing tape layer positioned on a top side of the inner core layer, a second reinforcing tape layer positioned on a bottom side of the inner core layer; wherein the top side is opposite the bottom side, a third reinforcing tape layer positioned on a first lateral side of the inner core layer, and a fourth reinforcing tape layer positioned on a second lateral side of the inner core. The third and fourth reinforcing tape layers provide edge reinforcement (i.e. at the lateral sides) that enables improved mechanical performance with designs having unsupported spans, i.e. distances without vertical reinforcement such as beams/posts. In one example, the first, second, third, and fourth tape layer are separate from each other.

Various forms of the present disclosure have the unexpected result of improving performance of a composite board arranged in a joist configuration. In one example, a joist configuration refers to an arrangement whereby a board spans between two beam/post supports, for example, as part of a ceiling or flooring construction. For example, certain enterprises use tape layers to provide temperature control properties that inhibit thermal expansion of composite boards due to sun exposure and heat. Applying tape or rods proximate or on lateral sides has been an unobvious modification given the emphasis on inhibiting thermal expansion and the manufacturing complexities associated with manufacturing composite boards. Unexpected results of improved mechanical performance were observed by building and testing various forms of this disclosure. Indeed, the unexpected result of improved modulus of elasticity and flex strength were observed by employing forms of this disclosure. Using at least one reinforcing tape layer, at least one reinforcing rod, or both and in very specific locations resulted in the unexpected results of strength of composite board arranged in, for example, a joist configuration.

This summary is provided to introduce a selection of concepts in a simplified form that are further described below in the Detailed Description. This Summary is not intended to identify key features of the claimed subject matter, nor is it intended to be used as an aid in determining the scope of the claimed subject matter.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

This disclosure addresses numerous issues with structural lumber. For example, tape limited to the faces of structural elements/boards that are loaded "edge-wise" have limited mechanical performance and limit applications for structural lumber. By locating and concentrating fiber reinforcements (e.g., glass) to the edges of structural lumber, when used in "on-edge" structural applications (described in greater detail below), the structural lumber has improved performance such as bending stiffness/modulus to enable longer unsupported spans, thereby reducing the number and cost of structural supports.

To solve these and other issues, the tape only on the edge was extended to widen the tape and modify the extrusion die to create pressures that force the tape to "wrap around the corner" and extend reinforcement tape with continuous fiberglass into the load bearing edge. More particularly, a specific width tape, tension on tape application, and die design was determined to force movement of the tape to the edge. In one example, glass was applied around the corner and across the edge, leaving about 33% of a surface area from each corner unreinforced. Additional forms include applying continuous fiberglass across the entire edge. In one form, continuous fiberglass is applied as thermoplastic tape, in any arrangement such as pultruded flat or rod form or as native continuous glass fiber. The teachings of the present disclosure locate an amount of glass to the edge in a form to increase stiffness in an edgewise configuration.

Certain benefits of the teachings of the present disclosure include an 18% increase in mechanical performance, i.e., bending stiffness while still enabling a fully consolidated and embedded application of fiberglass within the board construction, thereby enabling cutting with traditional construction tools (e.g., wood saw, circular saw, among others).

Figure 1:
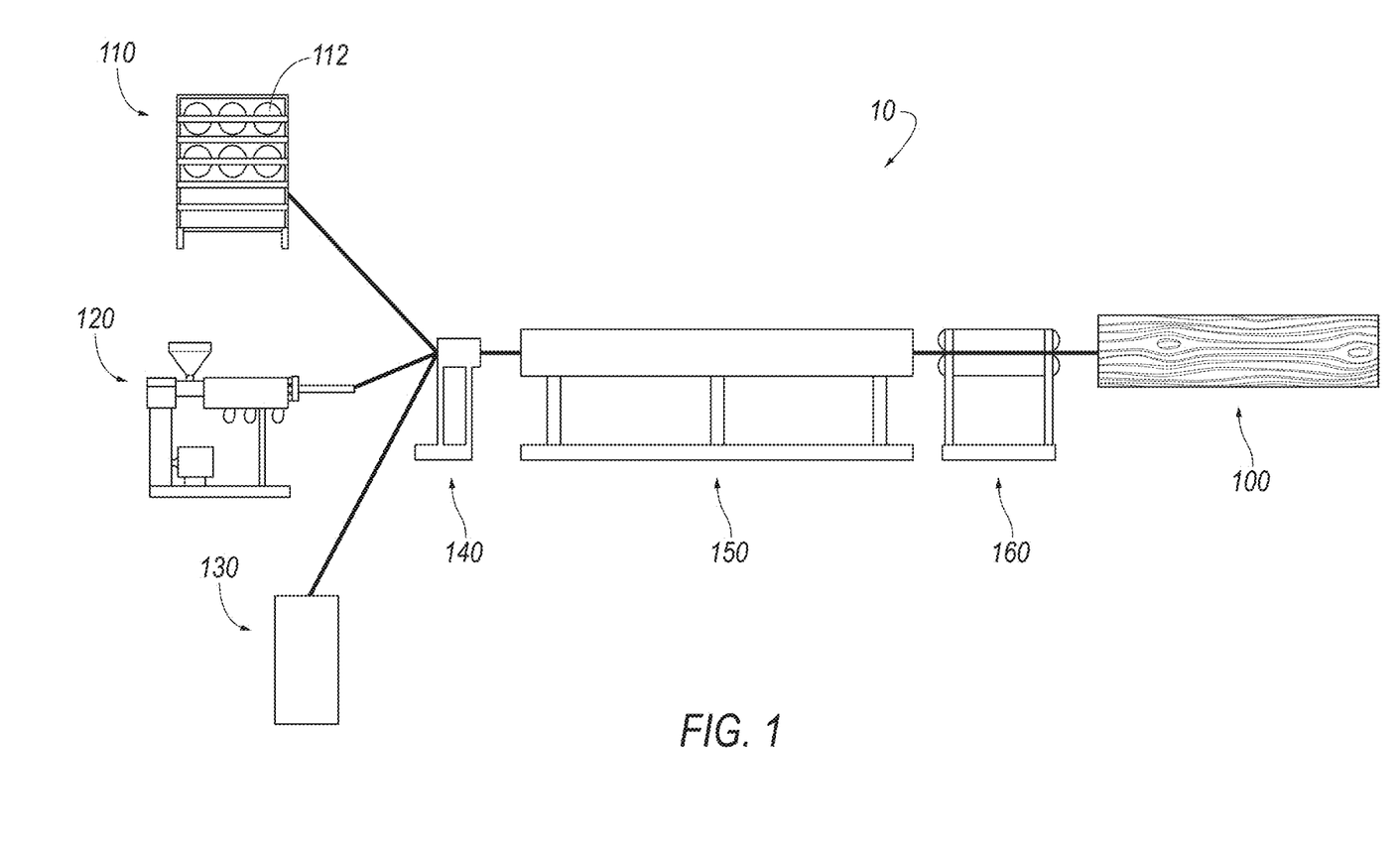
FIG. 1 is a schematic diagram of an example manufacturing line used to manufacture a composite board, in accordance with aspects of the technology described herein.

With reference to the figures, FIG. 1 is a schematic diagram of an example production line 10 used to manufacture a composite board 100. As used herein, the term "composite board" should be construed to mean a board comprising synthetic materials that are made by chemical synthesis to imitate a natural product, such as by way of example polymers and glass fibers as set forth herein. In addition to synthetic materials, the composite board 100 as illustrated and described herein may also include natural materials (e.g., wood, hemp, straw, cotton, flax, jute, sisal, bamboo, among others) while remaining within the scope of the present disclosure. In one form, the composite board 100 comprises at least about 30 wt. % polymeric composition and up to about 70 wt. % natural materials. These various materials of the composite board 100 are described in greater detail below. Therefore, the composite board 100 as disclosed and claimed herein may consist only of synthetic materials, or a combination of synthetic materials and natural materials while remaining within the scope of the present disclosure.

In the illustrated form, the production line 10 includes a tape rack 110 having reinforcing tape 112 (also referred to as a "tape feedstock," in one example), an extruder 120, a rod source 130, a die assembly 140, a cooling system 150, and a cutting assembly 160. The reinforcing tape 112 is used to form the reinforcing tape layer discussed herein. The extruder 120 receives raw plastic/polymeric materials, and then combines and heats the raw materials to form a heated mixture (hereinafter "heated polymeric mixture") that cools to become an inner core as set forth herein. The raw materials for the inner core may include, by way of example, a polymeric composition comprising a polymer (e.g., polyvinyl chloride (PVC), high-density polyethylene (HDPE), acrylonitrile butadiene (ABS), polypropylene (PP)), a foaming agent, a coupling agent, reinforcements such as by way of example calcium carbonate ($CaCO_3$), talc, discontinuous glass fibers, and glass nanotubes, among other additives. The rod source 130 generally provides fiber reinforcements, such as by way of example reinforcing rods (described in greater detail below), which are embedded into the inner core according to design specifications. The die assembly 140 receives the reinforcing tape 112 from the tape rack 110, the heated polymeric mixture from the extruder 120, and/or the reinforcing rods from the rod source 130. The die assembly 140 combines the heated polymeric mixture, the reinforcing rods, and the reinforcing tape 112 ("received materials") and sizes the received materials into a continuous composite board having a shape profile that is directed to the cooling system 150. The cooling system 150 receives and cools the continuous composite board from the die assembly 140. The cooling system 150 further directs the continuous composite board to a cutting assembly 160 that cuts the continuous composite board into the composite boards 100, which are further illustrated and described herein. In one form, the production line 10 is modular such that certain components may be removed and others added. For example, the rod source 130 may be removed so that the composite boards 100 are generated without reinforcement rods.

Figure 2A:
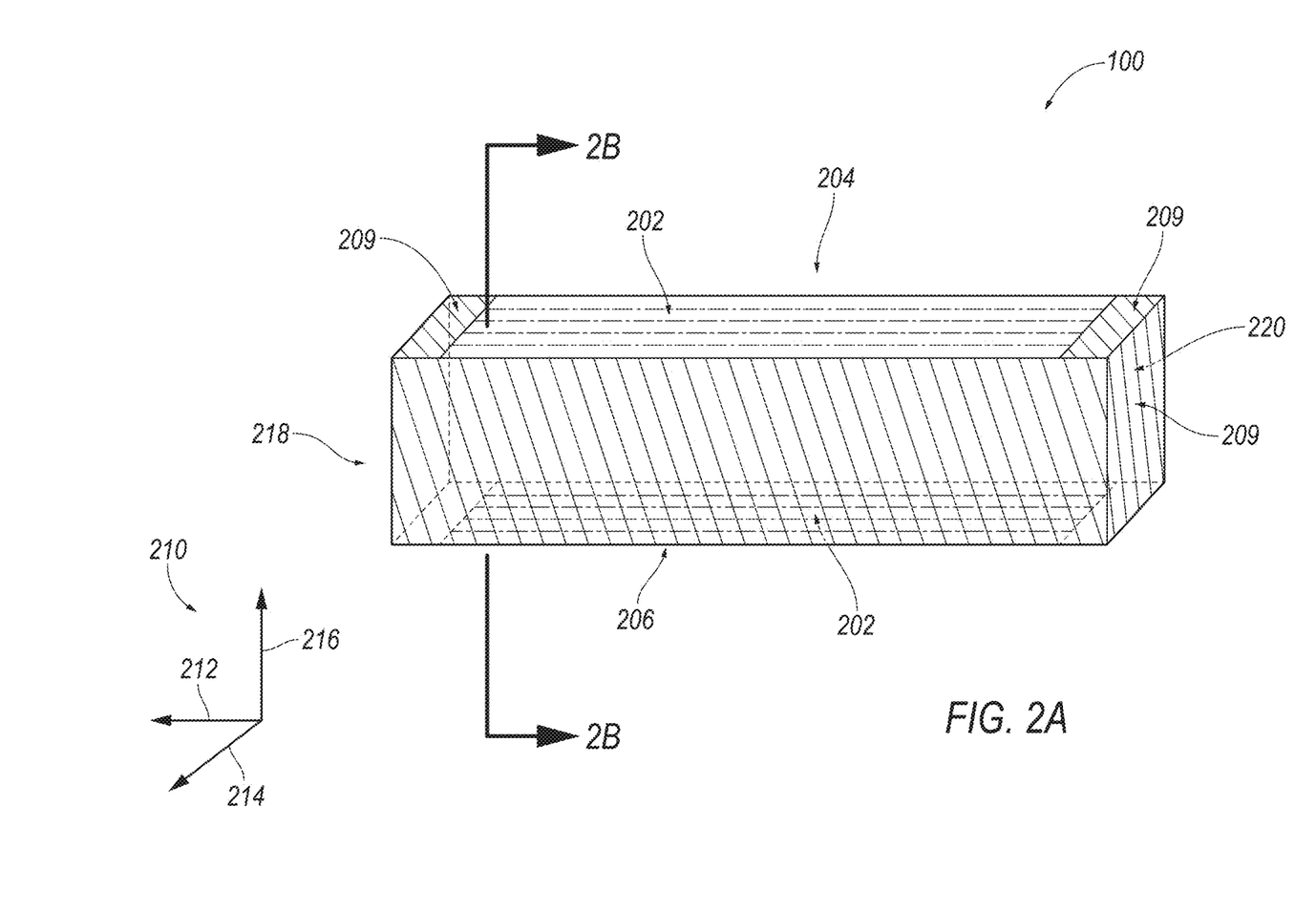
FIG. 2A is a schematic diagram of an isometric view of a composite board including a reinforcing tape layer on a top side and a bottom side of the composite board, in accordance with the teachings of the present disclosure.
Figure 2B:
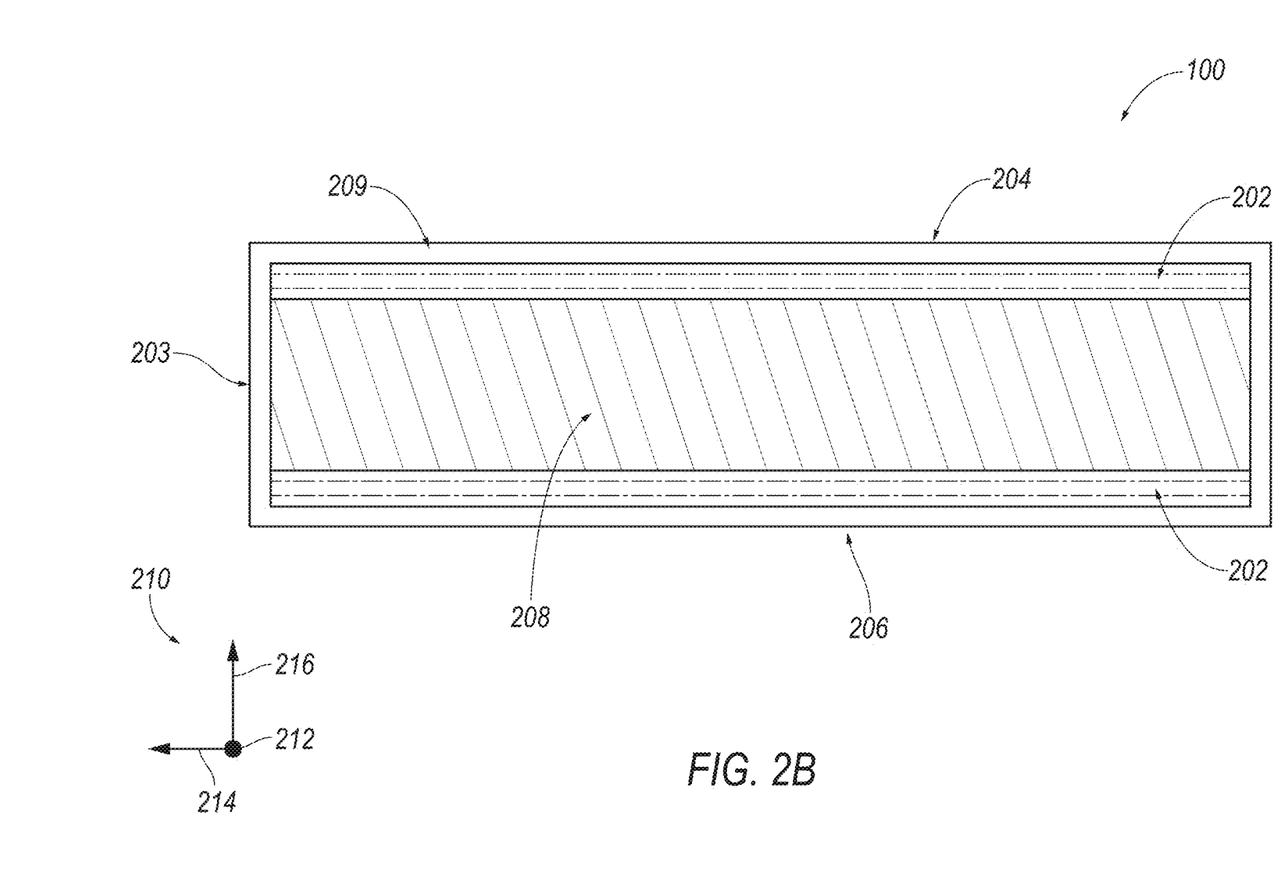
FIG. 2B is a cross sectional schematic diagram, taken along line 2B-2B of FIG. 2A, of a front view of a composite board including a reinforcing tape layer on a top side and a bottom side of the composite board, in accordance with the teachings of the present disclosure.

Referring to FIGS. 2A and 2B a composite board 100 including a reinforcing tape layer 202 on a top side 204 and a bottom side 206 is illustrated, in accordance with the teachings of the present disclosure. The reinforcing tape layer 202 generally provides structural reinforcement to an inner core 208. In one form, the inner core 208 comprises a polymeric composition, which may be in the form of a polymer foam (either open or closed cell), which includes a polymer matrix and other optional constituents such as structural reinforcements (e.g., calcium carbonate ($CaCO_3$), talc, discontinuous glass fibers, and glass nanotubes), among other additives. As illustrated, the outer skin layer 209 encloses and surrounds (i.e., encapsulates) the reinforcing tape layers 202 and the inner core 208.

To facilitate discussion, a coordinate system 210 having three orthogonal axes is reproduced. As illustrated, the example coordinate system 210 includes a longitudinal axis 212, a lateral axis 214, and a vertical axis 216. A length of the composite board 100 is defined along the illustrated longitudinal axis 212 between a front side 218 and a rear side 220. A width of the composite board 100 is defined along the lateral axis 214 between a first lateral side 203 and a second lateral side 205 (FIG. 2B). A height of the composite board 100 is defined along the vertical axis 216 between the top side 204 and the bottom side 206. (It should be understood throughout this description and the claims that each of the composite board 100 and the inner core 208 each define a top side, a bottom side, a first lateral side, and a second lateral side).

Figure 3:
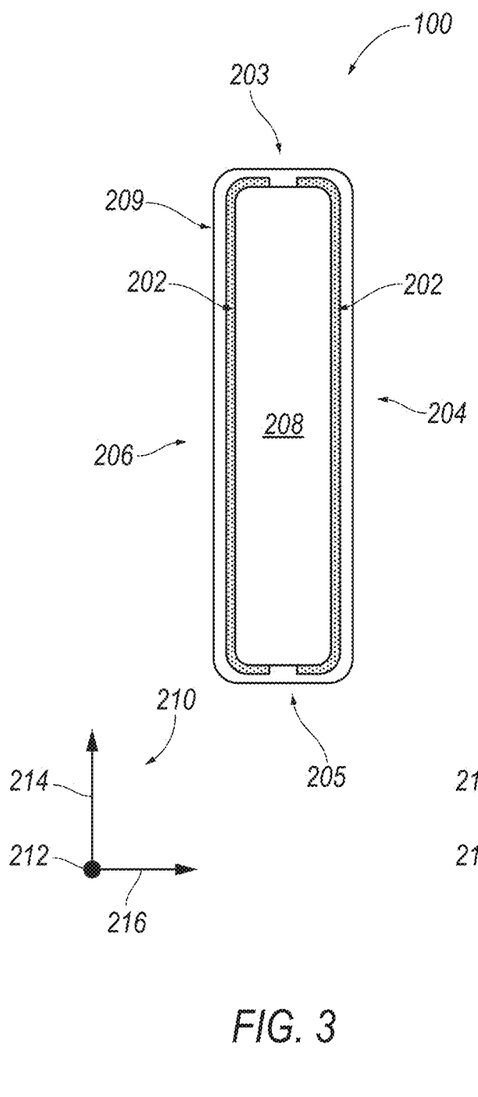
FIG. 3 is a cross sectional schematic diagram of a front view of a composite board having at least one reinforcing tape layer, in accordance with the teachings of the present disclosure.
Figure 4:
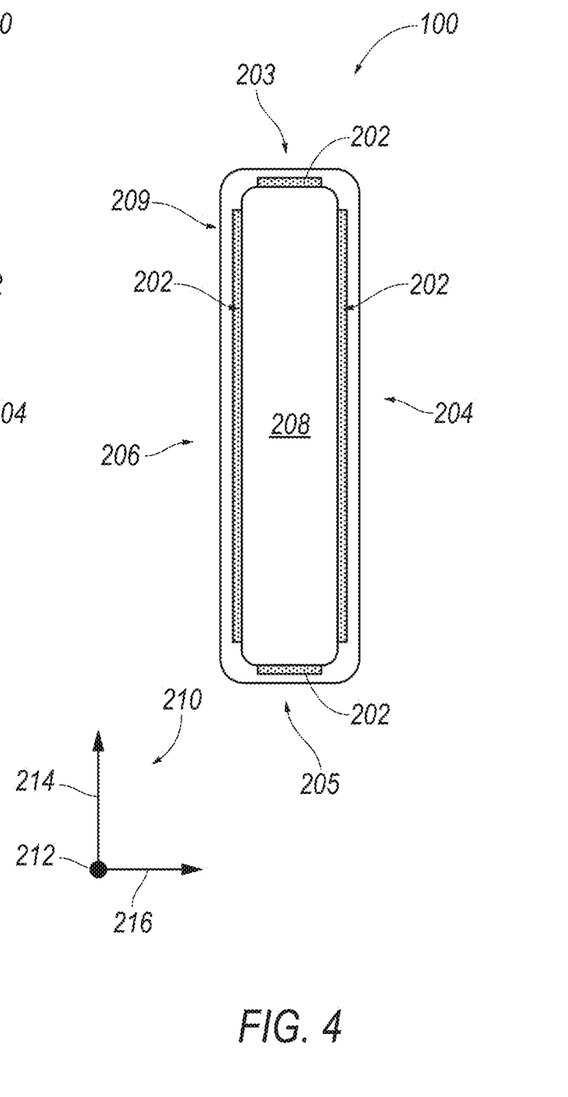
FIG. 4 is a cross sectional schematic diagram of a front view of a composite board having a plurality of reinforcing tape layers, in accordance with the teachings of the present disclosure.

Referring to FIGS. 3 and 4, a composite board 100 having a plurality of reinforcing tape layers 202 is shown, in accordance with the teachings of the present disclosure. In the variation shown in FIG. 3, the composite board 100 includes two separate reinforcing tape layers 202, namely, the lower layer and the upper layer, which each wrap around opposed corners as shown and extend partially along respective edges, leaving a space therebetween as shown. In the variation shown in FIG. 4, the composite board 100 includes four separate reinforcing tape layers 202. More specifically, the composite board 100 includes a reinforcing tape layer 202 comprising an upper layer positioned on a top side 204 of the inner core 208, a lower layer positioned on a bottom side 206 of the inner core 208, a first lateral layer positioned on a first lateral side 203 of the inner core 208, and a second lateral tape layer positioned on a second lateral side 205 of the inner core 208 as shown. The third and fourth reinforcing tape layers 202 provide edge reinforcement that enables improved mechanical performance with designs having unsupported spans, i.e. distances without vertical reinforcement such as beams/posts.

Figure 5:
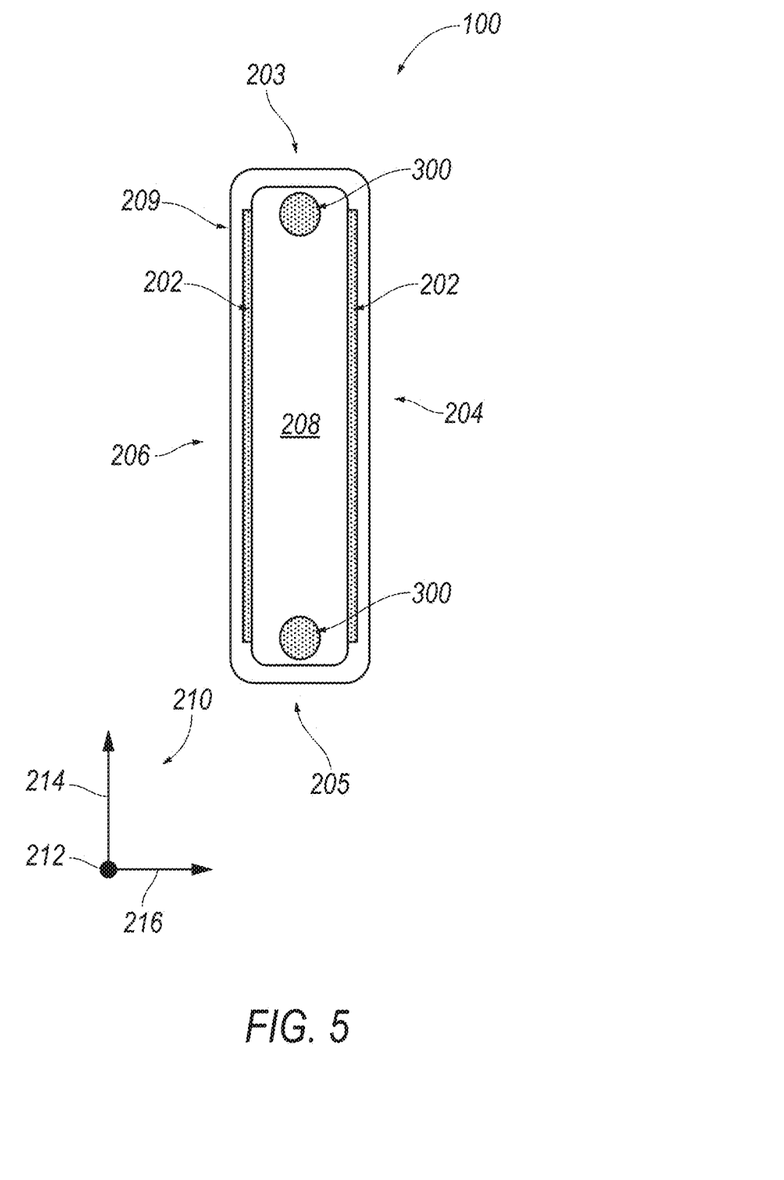
FIG. 5 is a cross sectional schematic diagram of a front view of a composite board having at least one reinforcing rod, in accordance with the teachings of the present disclosure.

Referring to FIG. 5, another form of the present disclosure is illustrated that also includes composite at least one reinforcement rod 300. In one form, the inner core 208 includes two reinforcement rods 300 extending from the front of the composite board 100 to the back of the composite board 100 along the direction of the longitudinal axis 212, or along a length of the composite board 100. In this example, the reinforcement rods 300 are located distally from a centerline of the composite board 100, wherein the centerline extends along the direction of the longitudinal axis 212 and is the midpoint between the first lateral side 203 and the second lateral side 205. As shown, reinforcement rods 300 in this form are located proximate the first lateral side 203 and proximate the second lateral side 205, thus providing increased bending stiffness proximate the first lateral side 203 and second lateral side 205. In this manner, the reinforcement rods 300 are positioned within the inner core 208 between the centerline and the first lateral side 203 and/or the second lateral side 205. In one example, the reinforcement rod 300 is made of any polymer (e.g., thermoplastic) that is positioned within the inner core 208 to increase bending stiffness, torsional rigidity, and compressive strength, among other mechanical properties.

In one form, one or more ends of the composite board 100 include continuous fiberglass. In this manner, the composite board 100 includes additional or alternative edge reinforcements. It should be understood that other types of fibers other than glass, such as by way of example carbon or aramid, may be used while remaining within the scope of the present disclosure.

Figure 6:
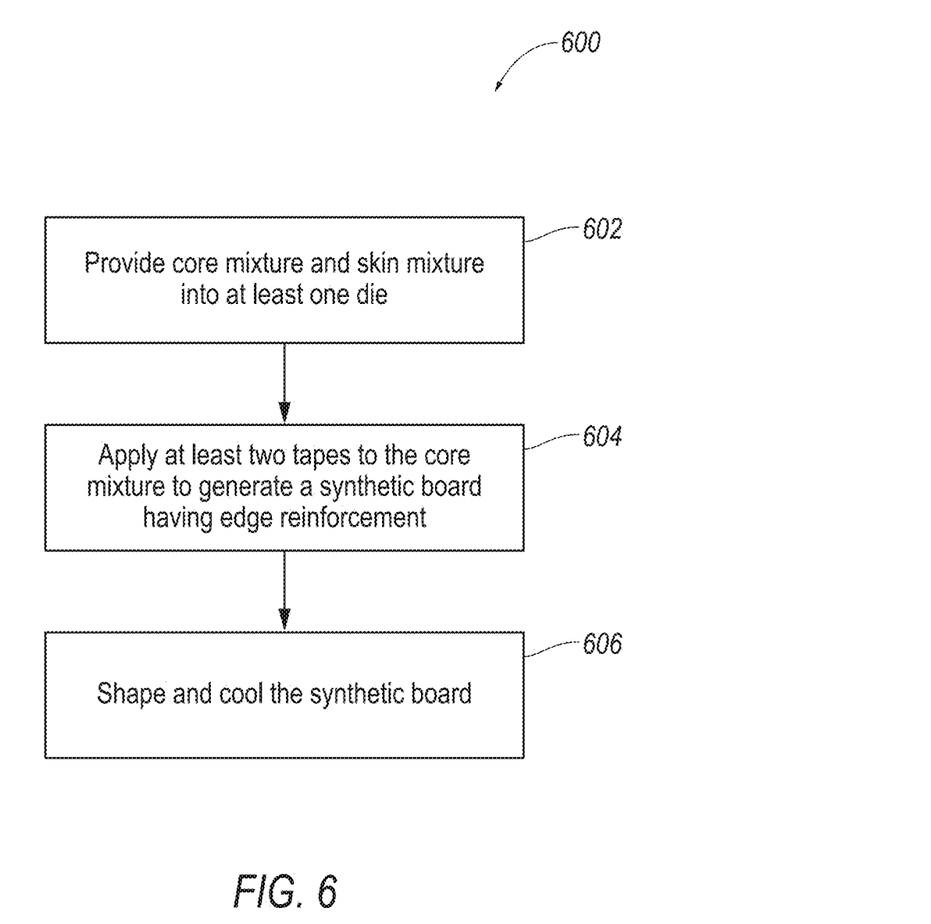
FIG. 6 is a flow diagram of a process to manufacture the composite board in accordance with the teachings of the present disclosure.

Referring to FIG. 6, a process 600 to manufacture the composite board 100 is shown. At block 602, process 600 includes providing the core mixture (e.g., polymer and foaming agent) and skin mixture (e.g., polymer and additives) into at least one die. At block 604, the process 600 includes applying at least two reinforcing tape layers 202 to the core mixture to generate a composite board 100 having the edge reinforcements discussed herein. At block 606, process 600 includes shaping and cooling the composite board 100.

Figure 7:
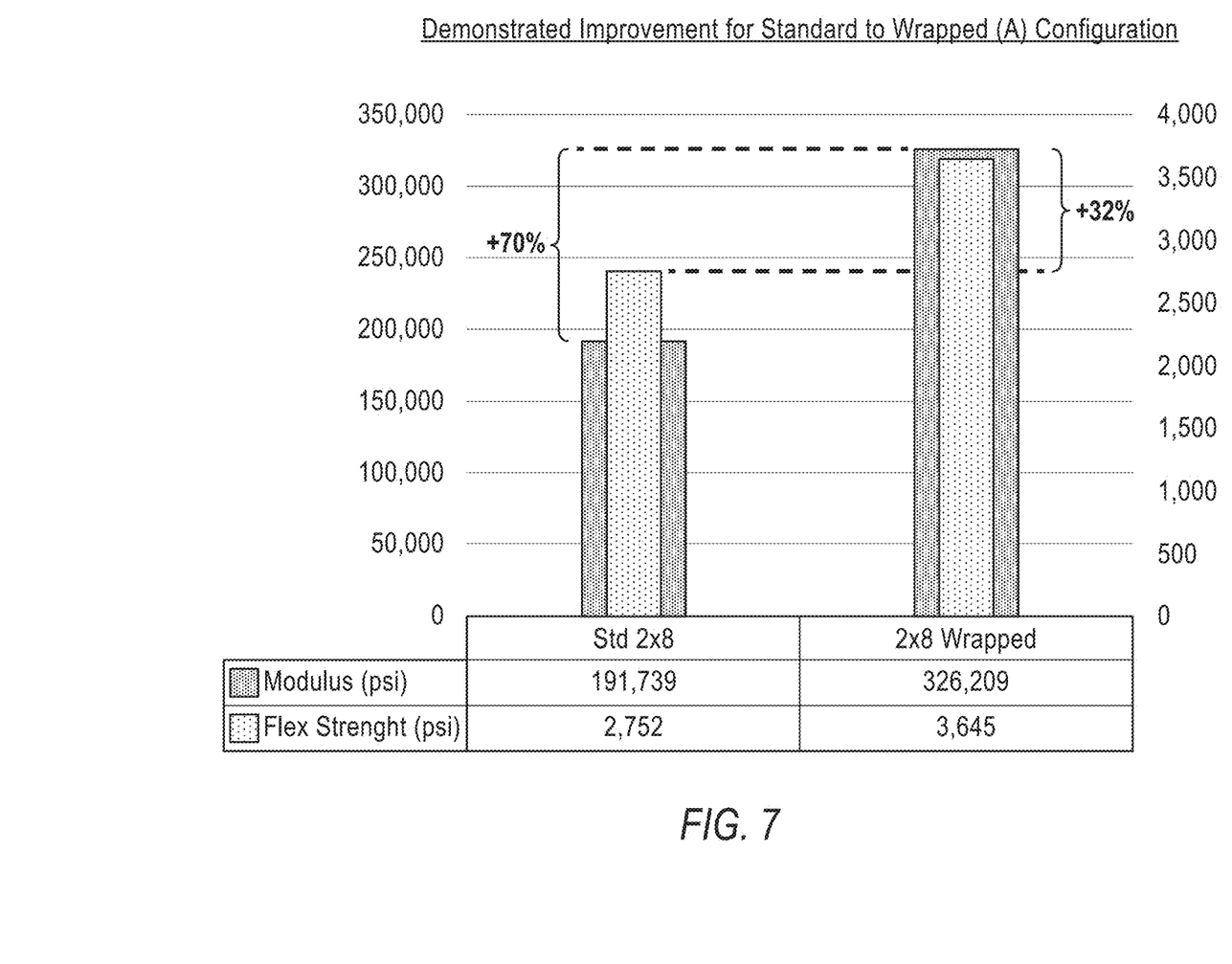
FIG. 7 is a graph illustrating improvements in mechanical properties achieved with the teachings of the present disclosure.

With reference to FIGS. 1-5, and with continuing reference to process 600 of FIG. 6, an example form was constructed, tested, and verified as described below. In this example, composite boards 100 having the edge reinforcements disclosed herein were tested and compared against a standard board without the edge reinforcements disclosed herein. For example, and as shown in the graph in FIG. 7, it was unexpectedly discovered that by employing the edge reinforcements disclosed herein, such as those illustrated in and described with respect to FIG. 3, a 2×8 composite board with the edge reinforcement disclosed herein had a 70% higher modulus of elasticity and a 32% higher flexural modulus.

In yet another form of the present disclosure, natural fibers (e.g., wood) may be employed rather than or in addition to the glass fibers (or other synthetic fibers) described herein. This form of the present disclosure includes a board having at least 20 wt. % polymer and up to about 80 wt. % natural materials. The natural materials may include, by way of example, wood flour, wood fiber, wood pellets, in addition to other natural materials besides wood in these various forms such as straw, hemp, flax, jute, sisal, bamboo, or cotton, among others. These natural materials and their various forms (e.g., fibers, pellets, nanofibers) should be construed as being within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A composite board comprising:
   an inner core defining a top side, a bottom side, a first lateral side, and a second lateral side, the inner core comprising a polymeric composition;
   at least one reinforcement rod extending longitudinally through the inner core;
   at least one reinforcing tape layer extending at least partially along the first lateral side and the second lateral side of the inner core; and
   an outer skin layer encapsulating the inner core and the at least one reinforcing tape layer.

2. The composite board according to claim 1, wherein the at least one reinforcing tape layer comprises:
   an upper layer extending along the top side, around opposed upper corners, and extending along a portion of the first lateral side and the second lateral side of the inner core; and
   a lower layer extending along the bottom side, around opposed lower corners, and extending along a portion of the first lateral side and the second lateral side of the inner core.

3. The composite board according to claim 2, wherein at least 33% of a length of each of the first lateral side and the second lateral side of the inner core is not reinforced by the upper layer or the lower layer.

4. The composite board according to claim 2, wherein the upper layer and the lower layer cover less than 50% of a length of each of the first lateral side and the second lateral side of the inner core.

5. The composite board according to claim 1, wherein the at least one reinforcing tape layer comprises:
- an upper layer extending along a portion of the top side of the inner core;
- a lower layer extending along a portion of the bottom side of the inner core;
- a first lateral layer extending along a portion of the first lateral side of the inner core; and
- a second lateral layer extending along a portion of the second lateral side of the inner core.

6. The composite board according to claim 5, wherein at least 33% of a length of each of the first lateral side and the second lateral side of the inner core is not reinforced by the first lateral layer or the second lateral layer.

7. The composite board according to claim 5, wherein the first lateral layer and the second lateral layer cover less than 50% of a length of each of the first lateral side and the second lateral side of the inner core.

8. The composite board according to claim 1, further comprising two reinforcement rods, each reinforcement rod being located proximate the first lateral side and the second lateral side, respectively, of the inner core.

9. The composite board according to claim 8, wherein the at least one reinforcing tape layer comprises an upper layer extending along a portion of the top side of the inner core and a lower layer extending along a portion of the bottom side of the inner core.

10. The composite board according to claim 1, wherein the at least one reinforcement rod is a polymer material.

11. The composite board according to claim 1, wherein the at least one reinforcement rod is round.

12. The composite board according to claim 1, wherein the inner core comprises a foam material.

13. The composite board according to claim 12, wherein foam material comprises reinforcements.

14. The composite board according to claim 13, wherein the reinforcements are selected from the group consisting of calcium carbonate (CaCO3), talc, discontinuous glass fibers, glass nanotubes, wood, hemp, straw, flax, jute, sisal, bamboo, and cotton.

15. The composite board according to claim 1, wherein the polymeric composition of the inner core comprises a polymer selected from the group consisting of high density polyethylene (HDPE), polyvinyl chloride (PVC), polymethyl methacrylate (PMMA), polyester resin (PR), polystyrene (PS), polypropylene (PP), phenolic resin (PF), and organic silicon resin (OSR).

16. The composite board according to claim 1, wherein the inner core comprises wood reinforcements.

* * * * *